(12) United States Patent
Shay et al.

(10) Patent No.: US 7,487,070 B2
(45) Date of Patent: Feb. 3, 2009

(54) METHOD FOR PLANNING A SECURITY ARRAY OF SENSOR UNITS

(75) Inventors: Peretz Shay, Shimshit (IL); Gabriel Yorai, Tel Aviv (IL); Ouzana Dror, Haifa (IL); Bar-Joseph Ittai, Shimshit (IL); Shefi Eran, Jerusalem (IL)

(73) Assignee: Defensoft Ltd., Hutzot Alonim (IL)

( * ) Notice: Subject to any disclaimer, the term of this patent is extended or adjusted under 35 U.S.C. 154(b) by 139 days.

(21) Appl. No.: 11/278,860

(22) Filed: Apr. 6, 2006

(65) Prior Publication Data
US 2007/0192068 A1    Aug. 16, 2007

Related U.S. Application Data

(60) Provisional application No. 60/772,557, filed on Feb. 13, 2006.

(51) Int. Cl.
*G06F 17/50* (2006.01)
(52) U.S. Cl. ............................... 703/1; 340/506
(58) Field of Classification Search ............ 703/1, 703/2; 340/506; 706/45
See application file for complete search history.

(56) References Cited

U.S. PATENT DOCUMENTS

| | | | |
|---|---|---|---|
| 5,408,217 A * | 4/1995 | Sanderford, Jr. | 340/506 |
| 6,392,692 B1 * | 5/2002 | Monroe | 348/143 |
| 6,545,601 B1 * | 4/2003 | Monroe | 340/521 |
| 6,687,606 B1 | 2/2004 | Moitra et al. | |
| 6,718,261 B2 | 4/2004 | Mattheyses et al. | |
| 2003/0206099 A1 * | 11/2003 | Richman | 340/506 |

OTHER PUBLICATIONS

Martinez et al., K. Environmental Sensor Networks, IEEE, vol. 37, Iss. 8, Aug. 2004, pp. 50-56.*

* cited by examiner

*Primary Examiner*—Russell Frejd
(74) *Attorney, Agent, or Firm*—Martin Fleit; Paul D. Bianco; Fleit Gibbons Gutman Bongini & Bianco PL

(57) ABSTRACT

Methods for planning a security array of sensor units are provided. In one embodiment, the method provides an optimized security planning for at least one entity. The method includes the steps of: receiving design data (for instance, geographically-referenced information) indicative of the geographic location; receiving data indicative of the sensors attributes (for instance sensor type, cost, weight, range); receiving data indicative of the preferred coverage area; receiving scenario constraints (for instance specific points of interest); conducting a graphic simulation of the proposed solution; generating multiple alternatives for the proposed solution.

16 Claims, 7 Drawing Sheets

METHOD FOR PLANNING A SECURITY ARRAY OF SENSOR UNITS

BACKGROUND OF INVENTION

1. Field of Invention

The present invention relates to an integrated system and method for designing a multiple sensors security architecture using computer-based simulation.

2. Description of Related Art

Various operations are becoming increasingly dependent on intelligent systems to guide the designing of security architectures and planning of mission tasks. The demand for comprehensive security solutions involving advanced technology is rapidly increasing, thereby constituting the need for a robust decision support computer-based framework.

Security operations may be extensively varied by nature, targets or cost. Some operations demand the planning of multiple routes for mobile dynamic force-tasks, while others the planning of a stationary architecture for securing facilities and surveillance.

One of the main components of routes planning operations involves the development of accurate and efficient route and sensor planning algorithms for a team comprising various team members. Most of the research in this field focuses on the routing of entities along stationary locations in various operational platforms including air, naval, ground, and various tactical combinations of all three. U.S. Pat. No. 6,687,606, incorporated by reference herein, describes a comprehensive architecture for such planning.

Another patent involved in routes planning is U.S. Pat. No. 6,718,261, incorporated by reference herein. It enables the generation of a system routes for plurality of entities through a predetermined area; a system routes for plurality of entities through a predetermined area and for scanning the predetermined area; a route for each of a plurality of entities through a predetermined area and a content analysis of the predetermined area.

A stationary security architecture planning consists of the positioning of multiple sensors in a selected area. Such planning should take under consideration different types of constraints constituted by the geographical nature of the area and by the mission special demands. An optimized planning should achieve security goals and in the same time meet mission constraints. A computer-based framework supporting such planning could achieve these desired results.

BRIEF SUMMARY OF INVENTION

The planning of stationary security systems involves the development of an effective algorithm simulating the positioning of multiple sensors within an area, enabling a maximum coverage of one or more strategic facilities' pre-defined points. This type of algorithm should be able to generate multiple security scenarios consists of static optimized view points based on area data and specific constraints.

Designing an effective algorithm that enables the processing of different types of area information might meet difficulties. Geographically-referenced information, stored as a digital file (also called GIS file), solely comprised of landscape objects, supplying only a partial description of the area. A long-run security planning should take under considerations the future construction of new buildings in the area and any landscape changes that might occur. Such information can be obtained from a computer-aided design (CAD) system's file containing present and future architectural planning. Furthermore, an optimized security plan should take under consideration different types of scenario constraints and the use various types of sensors.

The system should overcome technical and technological obstacles. It should be able to integrate digital files stored in different formats, such as GIS and CAD and generate a robust simulation based on said sources. The system should be able to rapidly process complex graphic data and supply a 3D view point simulation of the related area.

Another problem is enabling the generation of an optimized security solution based on said data area and scenario constraints. Such solution should supply multiple alternatives comprised of sensor-location recommendations and a 3D view point simulation of covered area by said sensors. The system should take under account complex scenario constraints, such as cost, land condition or points of interest and generate an optimized solution based on said constraints.

The present invention is generally directed at addressing the above-mentioned targets, and problems of the prior art. It enables the security supervisor to generate a comprehensive and optimized security solution and furthermore, supports long-run and short-run operational decisions.

Broadly stated, the present invention is generally directed to a security decision support system enabling at least one security supervisor to generate multiple optimized security alternatives comprising: a GIS geographical data and a CAD design information processor; a Graphic interface enabling the security supervisor to intuitively enter operational requirements; a graphic interface supporting multiple imagery types including aerial photo images, orthophoto images and satellite images; a graphic simulator supporting the security supervisor's decision making of the best solution; a mathematic engine supporting complex graphic manipulations and multilayered geographic data processing; and multiple mathematical algorithms supplying optimization iterative processes for calculating the optimal design parameters within the given constrains, thereby providing the desired coverage area.

In accordance with one aspect of the present invention, a simple planning method for analyzing the optimized position of at least one sensor is given. The method includes the steps of: providing the optimized latitude and angle for one or more sensors, based on pre-defined geographic location. More specifically, the optimized solution includes the following parameters: sensor latitude, pitch, roll and yaw.

In accordance with another aspect of the present invention, an advanced planning method for analyzing the optimized location of at least one sensor is given. The method includes the steps of: providing the optimized geographic location of one or more sensors, based on scenario constraints. More specifically, the optimized sensors' location comprised of the following parameters: sensor coordinates, sensor latitude, sensor pitch, roll and yaw.

Security architecture is constituted by operational demands and specific scenario constraints. Determining the appropriate constraints may essentially affect the planning results. By allowing the security supervisor to select from a wide range of optional constraints, the system enabling a more accurate and optimized planning. Said optional constraints may consist of one or more of: the area of percentage of the area to be observed; specific points of interest which have to be observed; specific points of view or maximum latitude; the area from which operation is possible; Required correlation between devices; constraints derived from infrastructure such as distance, accessibility, power supply, communication, etc; land condition and ownerships; interoperable demands between sensors; overall costs; devices; site modification: infrastructure and human factors.

One result of the optimized solution is locating multiple sensors at specific coordinates, latitude and angle, wherein sensor angle is a composition of the recommended roll, pitch and yaw. Visual sensors can be of different types, range and cost. The appropriate sensor type and location is derived from operational demands and scenario constraints. In addition, the system allows the locating of sensors which are not solely visual. These sensors can be attached to visual sensors, or is part of the general security planning, and can be of various types: acoustic sensors, thermal, seismic, chemical, radiological, biological and Geiger counter sensors.

One advantage of the invention is that it enhances a security supervisor's decision making throughout the planning process, thereby enabling an optimized usage of a sensor network and reducing the risk of critical planning mistakes.

Another advantage of the invention is that it supplies an intuitive graphic of future project architecture and its surroundings, thereby enabling the visualization of multiple alternatives and supporting an easy comparison with operation requirements. Furthermore, it supplies a graphic simulation of the area using multiple view points such as sensor's point of view.

Another advantage of the invention is that is supplies various engineering tools supporting the architecture design process thereby enabling a more comprehensive solution.

BRIEF DESCRIPTION OF THE SEVERAL VIEWS OF THE DRAWINGS

These and further features and advantages of the invention will become more clearly understood in the light of the ensuing description of a few preferred embodiments thereof, given by way of example only, with reference to the accompanying drawings (FIGS.), wherein.

DETAILED DESCRIPTION OF THE INVENTION

The security design system is designed specifically to meet the requirements of planning in large terrain spaces using updating imagery information, considering civil engineering interventions and technical specification of surveillance and reconnaissance devices. The combination of essential capabilities is beneficial for the achieving of an effective defense plan for any area involved. In essence, the system generates a graphic simulation of a scenario based on user specifications, using powerful mathematical algorithms and pre-defined graphic data.

Figure 1:
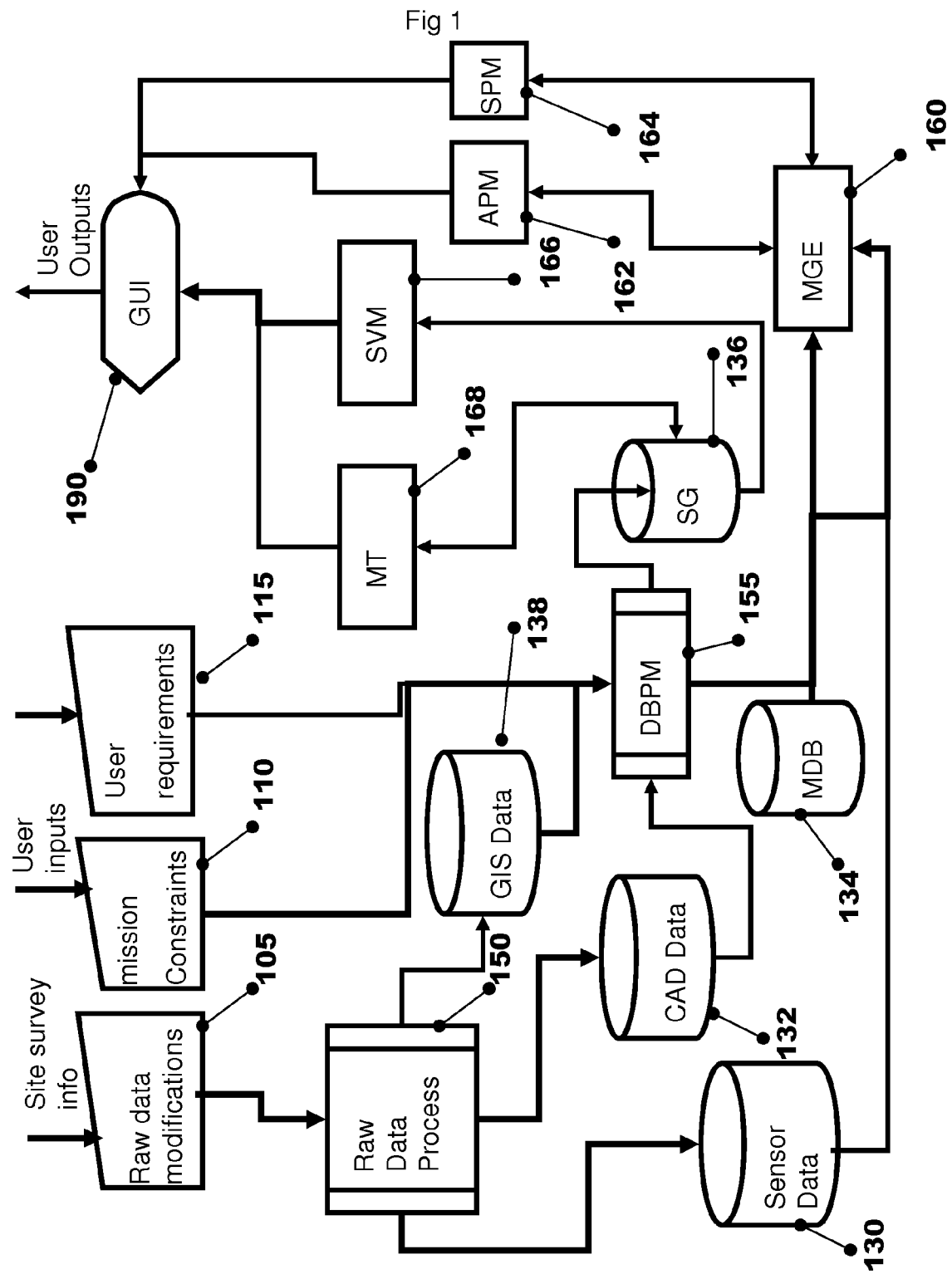
- FIG. 1 is a block diagram of an embodiment of the invention.

FIG. 1 illustrates the main system components. Pre-defined raw data (105), generally comprised of site survey info comprising GIS data, construction data (CAD) and sensor data is processed (150) and stored in relevant databases (138, 132 and 130, respectively). Survey GIS data comprised of surface elevation data and various entities placed in the site, such as trees or rocks. The Data Base Pre-process Module (DBPM) (155) converts the data stored in the GIS (138), CAD (132) and sensor (130) data bases to a hardware supported format. Information in its new format is then stored in the Scene Graph (SG) database (136) to enable optimized capabilities needed during automatic planning processes and simple planning processes conducted by the automatic planning module (APM) (162) and simple planning module (SPM) 164) respectively. Both automatic and simple planning method processes make use of a mathematic geometric engine (MGE) (160). This engine enables the generation of geometric data using advanced algorithms for solving complex optimization tasks and decision problems derived from sensor position planning. The MGE (160) algorithms make use of a mathematical database (MDB) (134), which, in turn, enables fast access to relevant data during calculation processes and analysis phases. A graphic simulation of a specific scenario can be obtained through the GUI device (190) once all relevant pre-defined raw data were processed. The Simulation Visualization Module (SVM) (166) provides a graphic simulation of the scenario instantiated by mission constraints data (110) and specific requirements (115). Scenario simulation can also be manipulated externally, through the Modeling Tool (MT) (168) which enables the user to add, remove and control three-dimensional (3d) entities in the Scene Graph, such as adding or removing trees or rocks. The MGE (160) algorithm provides geometrical analysis of the site data for testing the design constraints effect on each sensor units monitoring capabilities.

The security design system is a decision support framework, enabling a security operator to generate different security solutions based on various types of scenario alternatives. Using its simple and automatic plan modules, the system can generate a visual simulation/representation of a security solution constituted by user constraints and site data. The plan module allows different types of simulation. In general, plan module can be activated as either a "Simple Plan Module" (SPM) or an "Advanced Plan module" (APM). Based on specific coordinates and sensor data, the SPM solution supplies a simulation of a coverage area and optional latitude and angle recommendations, wherein the angle recommendation is a composition of roll, pitch and yaw. The APM calculates an optimized security solution based on user constraints specifications.

Figure 2:
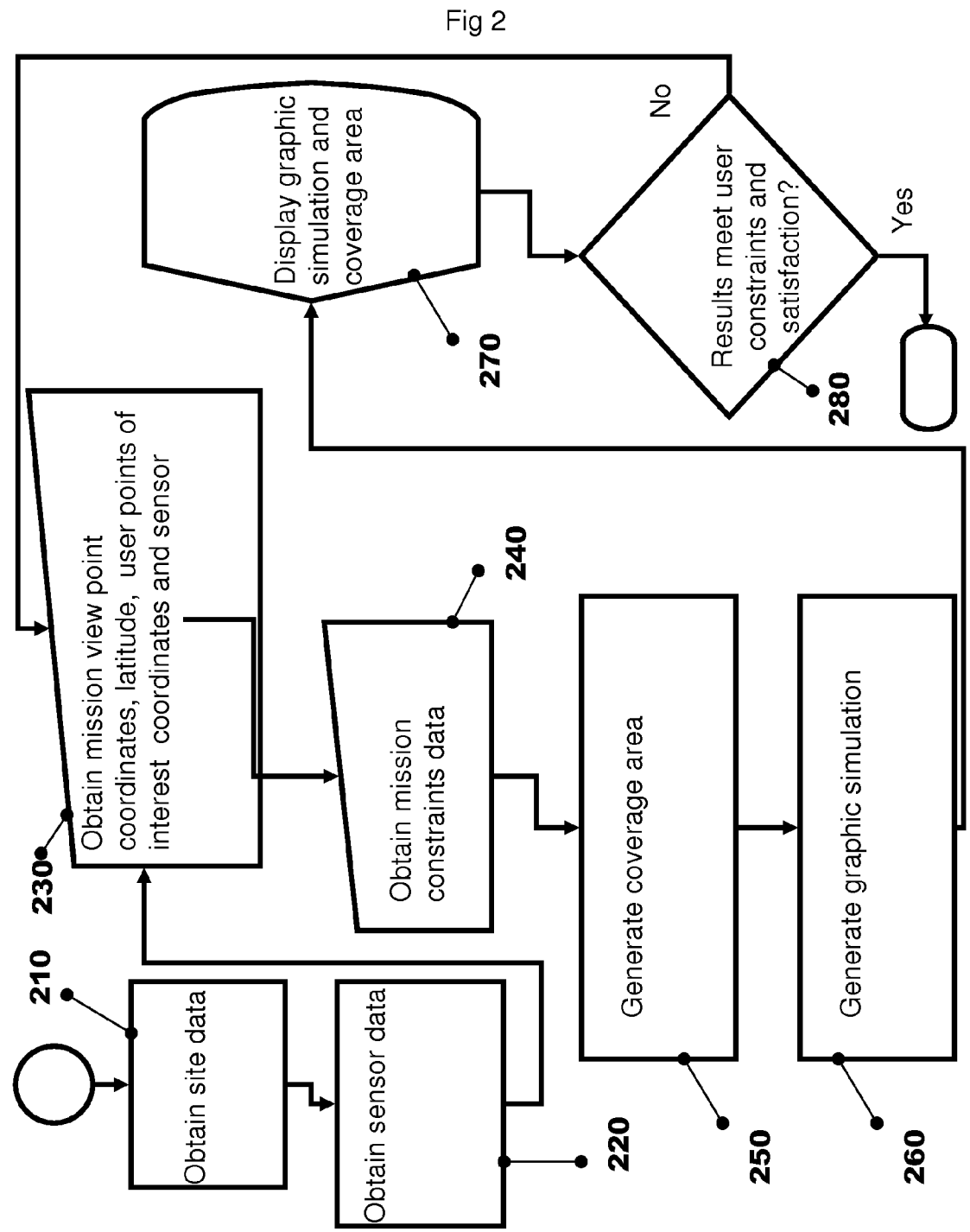
FIG. 2 is a flow chart of a simple planning method of the invention.

A more detailed view of the SPM is illustrated in FIG. 2. In this scenario, a simulation and a map of the coverage area is supplied. Process starts with obtaining site data (210). Site data comprised of GIS data describing past and present site entities, CAD data, usually describing future entities and ad hoc entities created by the Modeling Tool. Once geographic data is acquired, sensor data is obtained (220). Sensors can be of various types and play different roles in the security environment, based on their functionality and range. The sensors are represented in the system as a standard object-like table comprised of their natural attributes, like, for example, sensor type, size, weight, maximum range, maximum roll, pitch and yaw, availability and cost. In an embodiment of the invention, main sensors used in the simulation are optical-type. In addition, sensors can be of other types, such as acoustic sensors, thermal, seismic, chemical, radiological, biological and Geiger counter sensors. Once all essential information is gathered from the data base, the user is asked to specify the details regarding the scenario simulated. At this point user should specify the point-of-view coordinates, the associated relative latitude and a set of points of interest coordinates (230) using the SVM graphic simulator. The simulator enables the user to get a 3d view of said area, through a selection of available sensors and choose the exact point of view and points of interest needed for the scenario. A multiple selection of view points can be obtained, and for each of these points, different types of sensors can be associated. Furthermore, the user can specify special constraint terms that must be met for said scenario, such as minimum coverage area percentage and maximum feasible latitude (240). Once the selection of point of view and latitude is completed, a coverage area is generated, based on sensor selection (250). Each coverage area is associated with one sensor and may be painted by distinctive colors. The coverage area can be projected on an image of the actual site. Images can be of various types and of different sources, such as aerial photo images, orthophoto images and satellite photo images. The system enables the user to change any of the scenario parameters heuristically, in order to achieve his targets and meet specified constraints, using the SVM tool (260) through said graphic simulation (270). The simulator enables a 3d view of the area through the selected sensors, thereby allowing an illustration of the actual recommended solution. Furthermore, the recommended solutions can be exclusively inspected using a 3d simulation, illustrating the actual sensor's view point. The simulation can be completed at any stage, whenever the user targets are accomplished and constraints met (280).

Figure 3:
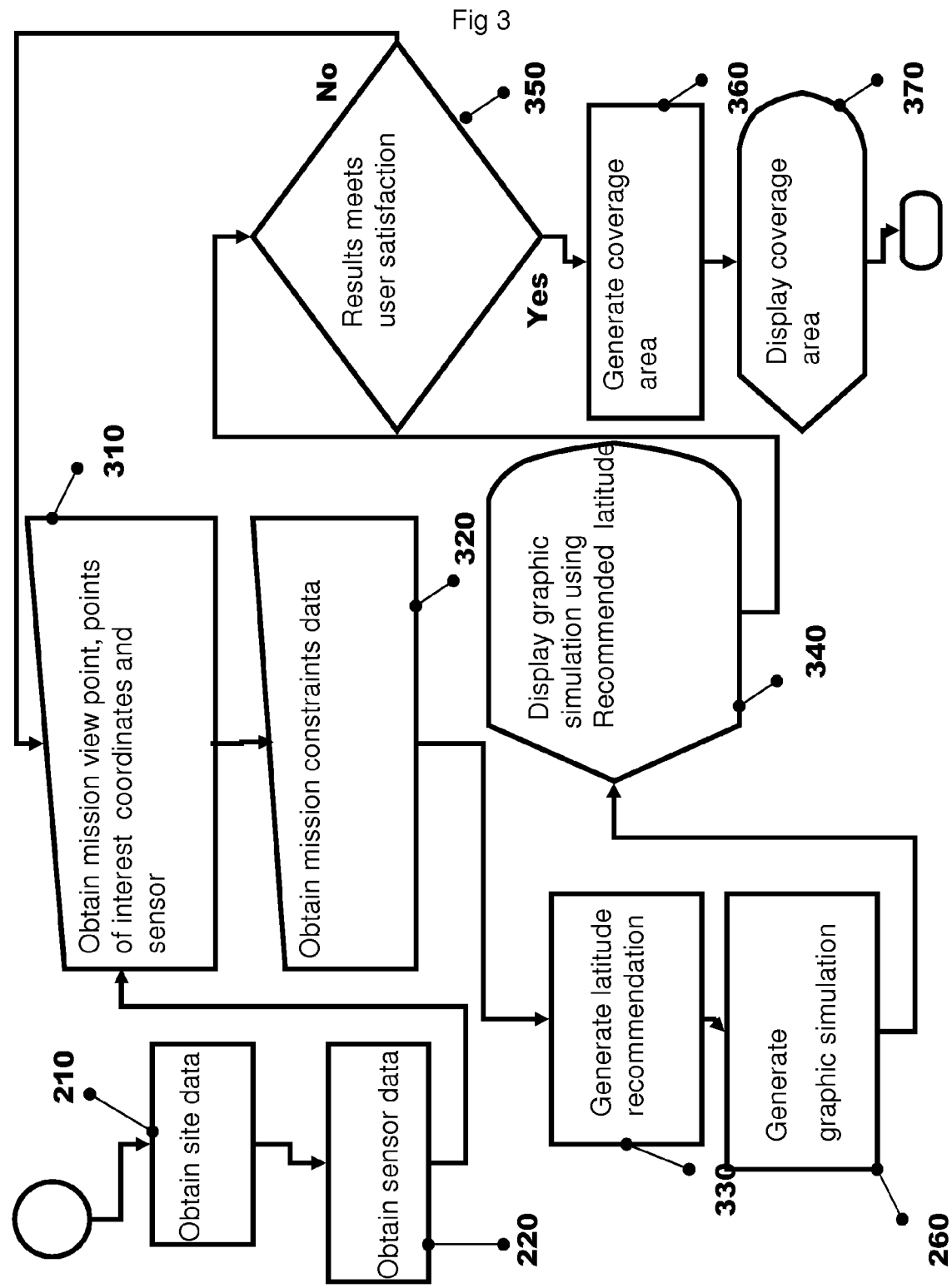
FIG. 3 is a flow chart of another aspect of the simple planning method.

A different type of SPM simulation is illustrated in FIG. 3. In this scenario, latitude and angle recommendations are generated and a simulation of a coverage area is supplied. Similarly to the method described above, the process starts with obtaining site (210) and sensor (220) data. Once all essential information is gathered from data base, user is asked to specify the details regarding the scenario simulated. At this point, the user should specify the point-of-view coordinates, a set of points of interest coordinates and the desired sensor (230) using the SVM graphic simulator. The simulator enables the user to get a three dimensional view of said area, through a selection of available sensors and choose the exact point of view, a specific sensor and multiple points of interest needed for the scenario. Furthermore, the user can specify special constraint terms that must be met for said scenario, such as minimum coverage area percentage and maximum feasible latitude (240). Once the selection of point of view is completed, latitude and angle recommendations are generated (330), accompanied by a graphic simulation of the area (260) viewed from said height (340). The recommended solutions can be exclusively inspected using a 3d simulation, illustrating the actual sensor's view point. If any of the constraints specified by the user could not be met, process allows the user to change its parameters (350). If recommendations are approved, a coverage area is generated (360) and graphically displayed (370). The coverage area can be projected on an image of the actual site as earlier described.

Figure 4:
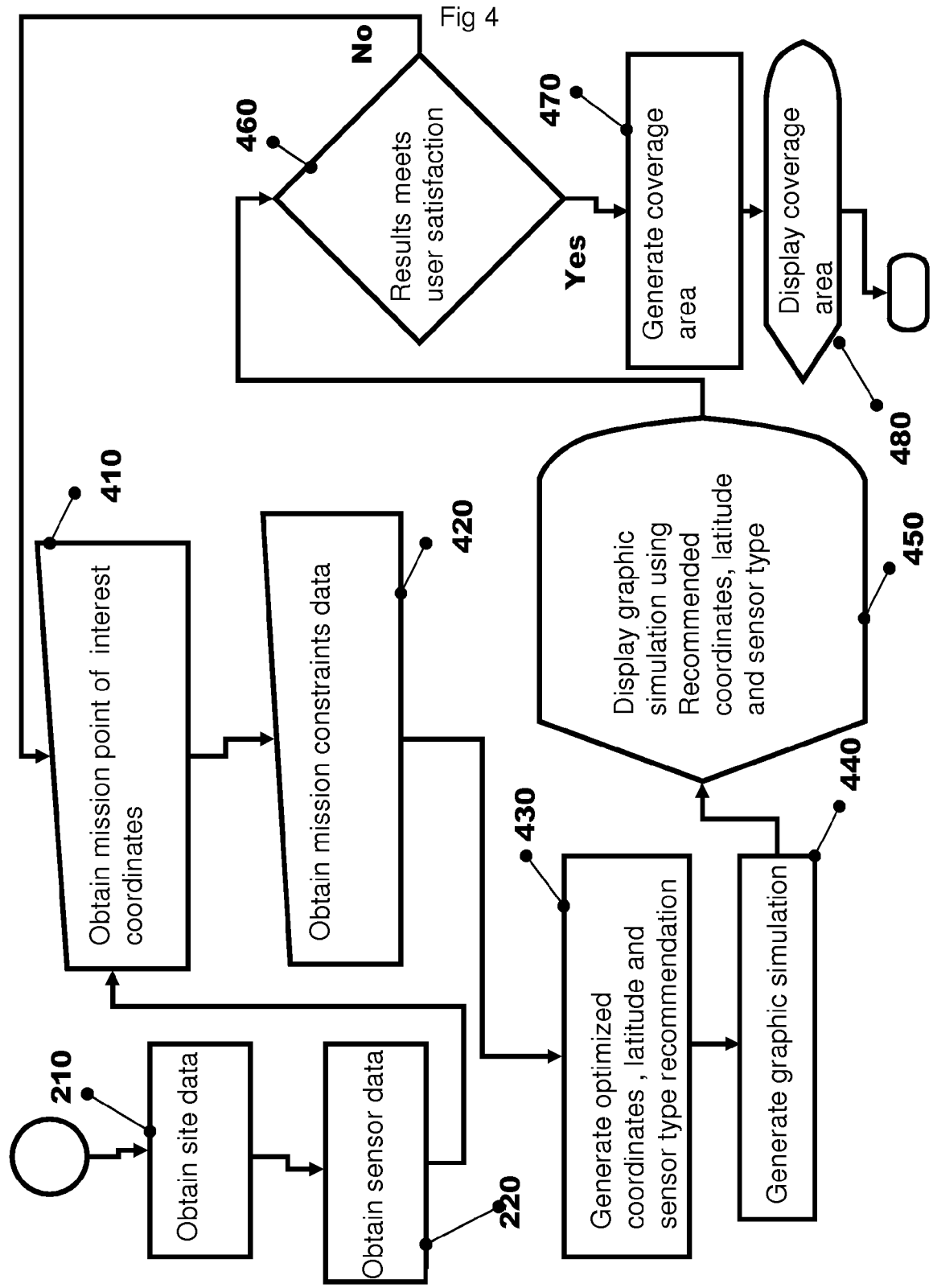
FIG. 4 is a flow chart of an advanced planning method.

A more advanced simulation is given by the APM device. A closer look on this alternative is illustrated in FIG. 4. In this scenario, a security solution is generated and a simulation of a coverage area is supplied. The security solution comprises multiple view points accompanied by a sensor recommendation for each said point. A recommended view point consists of actual map coordinates associated by relative latitude and angle. Consequently, an optimized solution is generated, based on user constraints. User constraints span a wide variety of operational categories, constituting the desired specific solution, and can be one or more of the following options:

The area to be observed or the percentage of that area.
Specific points of interest which have to be observed
Specific points of view or maximum latitude.
The area from which operation is possible
Required correlation between devices
Constraints derived from infrastructure such as distance, accessibility, power supply, communication etc.
Land condition and ownerships
Interoperable demands between sensors.
Overall costs: devices, site modification, infrastructure and human factors.

Furthermore, a mission time scope can be selected. A short time scope determines a more dynamic mission nature and fast optimization solutions, while a long run scope determines a more static mission nature, and an unlimited optimization time. A good example for a short time scope mission could be served, when imagining a force task moving into a mission territory. In order to optimize force's control over mission territory, a maximum coverage area of said territory must be obtained. Moreover, the nature of such missions, forces optimization process to supply the scenario simulation in a short time. A long time scope example could be served by the traditional guard tower. System will recommend the position and height of multiple towers, based on mission constraints. Similarly to methods described above, process starts with obtaining site (210) and sensor (220) data. Once all essential information is gathered from data base, the user is asked to specify the details regarding the scenario simulated. At this point the user should specify the points of interest coordinates (410) using the SVM graphic simulator, along with other said mission constraints (420). Once all mission constraints have been assigned, one or more optimized solutions are generated (430), accompanied by a graphic simulation (440), thereby enabling the user to explore said area using recommended view points and associated sensors (450). The system enables the user to select the desired solution if multiple results were generated and change any of the mission constraints heuristically, in order to achieve his targets (460). Each of the recommended solutions can be exclusively inspected using a 3d simulation, illustrating the actual sensors' view point. If results meet mission requirements, a coverage area is generated (470) and graphically displayed (480) in the same manners earlier described.

The system can provide various types of reports. A report generally comprises system recommendations consisting of sensors type and location. These reports can be generated in an HTML file format, Excel file format, CAD report or in a GIS image format.

Figure 5:
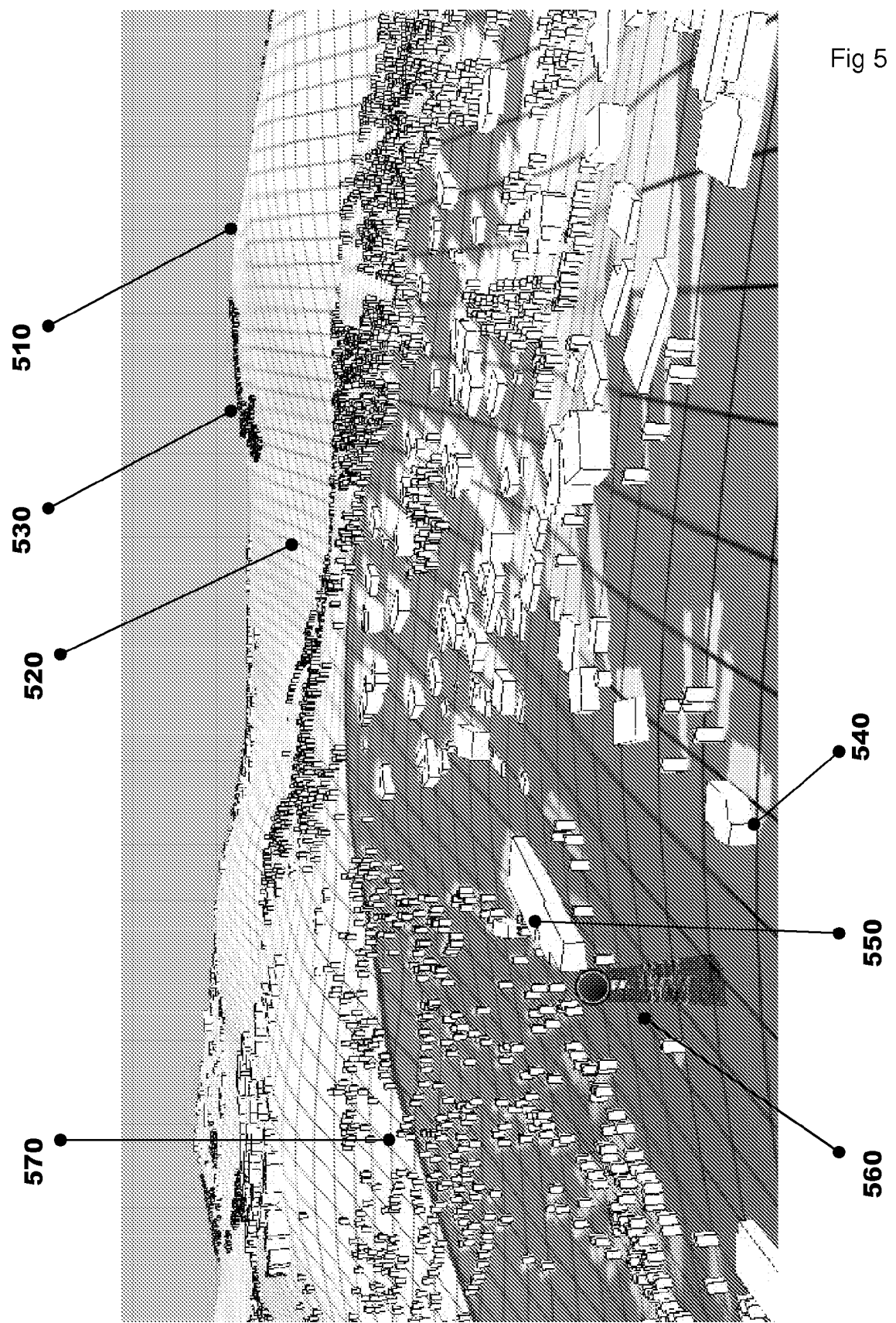
FIG. 5 is illustrating the positioning of a sensor within map area.

A good example for the advanced planning method simulation is illustrated in FIG. 5. Simulation starts with obtaining site data and sensors data. Site data is comprised of different types of landscape properties and construction entities. Landscape properties can be of various types, such as hills (510), a valley (520) or trees (530). Construction entities describe all existing buildings within the area (540) and any construction planned to be built in the future (550). Once scenario constraints are entered, an optimized security solution is generated and multiple sensors of different types are located (560) at the area. For each of the sensors located, a coverage area is supplied (570), with distinctive visual indications such as painted with different colors (or cross-hatching), to emphasize the distinction between covered and uncovered areas (580).

Figure 6:
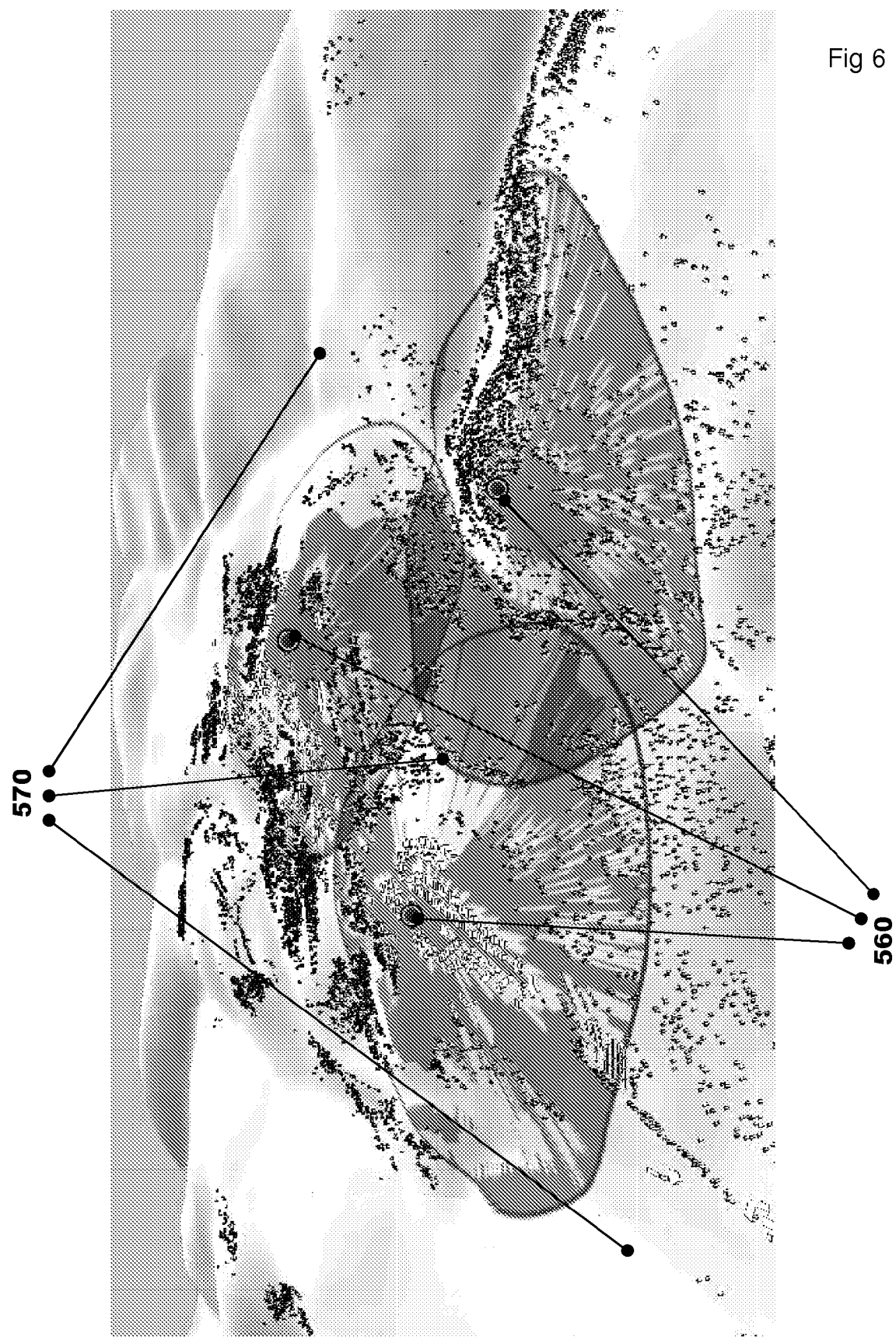
FIG. 6 is illustrating the generation of a coverage area for three different sensors.

A different point of view of the coverage area is illustrated in FIG. 6. Once all sensors are located (560), coverage areas are associated (570) respectively. Each coverage area is painted with different colors thereby allowing a clear distinction between covered and uncovered areas.

Figure 7:
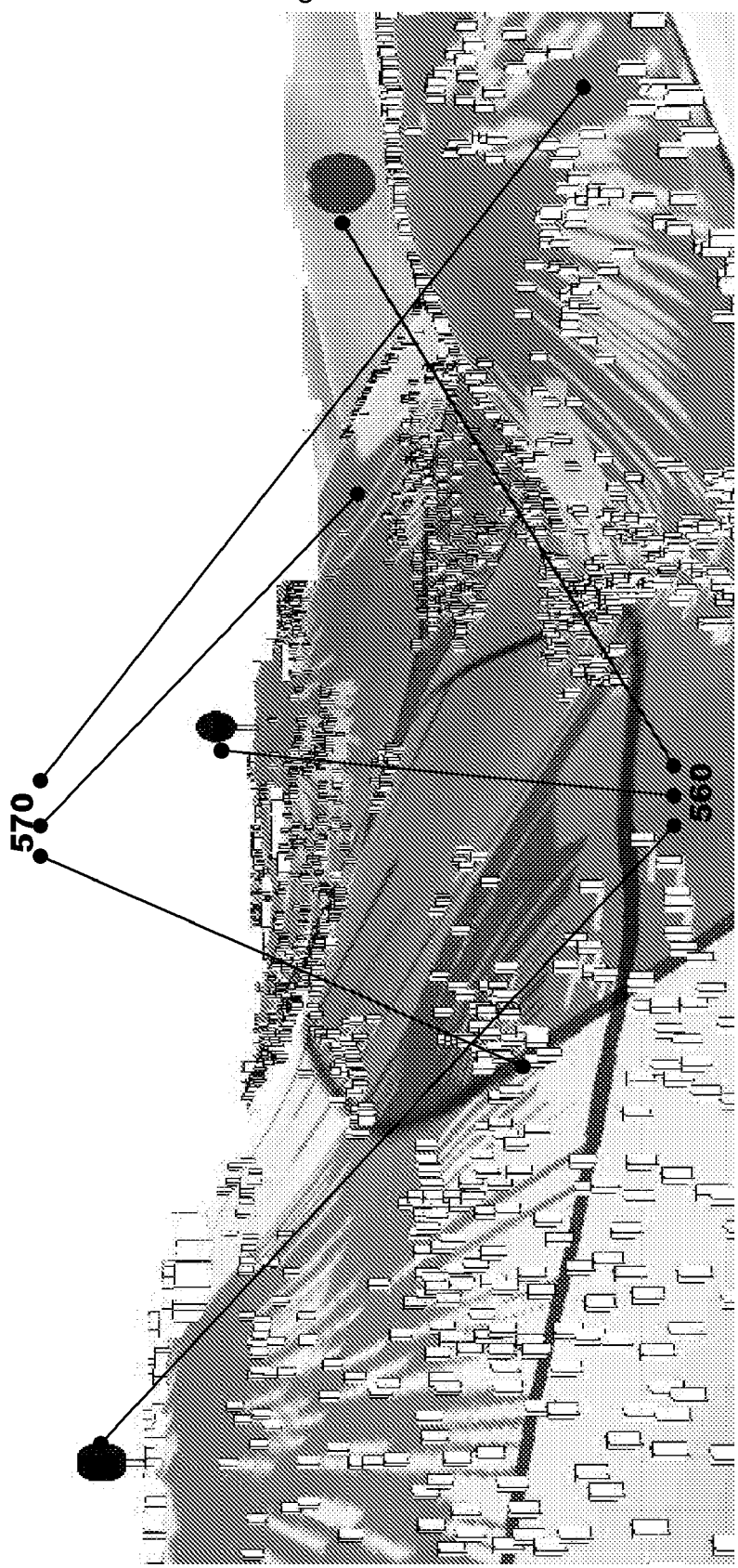
FIG. 7 is another illustration of the generation of a coverage area for three different sensors.

Another point of view of the coverage area is illustrated in FIG. 7. The System enables the user to view sensors (560) and coverage area (570) from various angles thereby improving simulation control and supplying an advanced decision support framework.

Various engineering tools supporting the architecture design process are supplied. These tools allowing the user to measure distance on a two or three dimensional maps; analyze various paths in order to find an optimized one; analyze territory slope and intersections.

While the above description contains many specifics, these should not be construed as limitations on the scope of the invention, but rather as exemplifying of the preferred embodiments. Those skilled in the art may envision other possible variations that are within its scope. Accordingly, the scope of the invention should be determined not by the embodiment illustrated, but by the appended claims and their legal equivalents.

What is claimed is:

1. A computerized method for planning a security array of sensor units for monitoring a target site, said method comprising the steps of:
    obtaining site data including geographical data and CAD design information relating to the site;
    defining user requirements for the target site, including monitored area coordinates;
    defining design constraints relating to user requirements for the site data; and
    analyzing the site data with site definitions and constraint definitions, for computing at least one design parameter of the security array, wherein said analysis includes gometrical processing of site data for testing the design constraints effect on the sensor units monitoring capabilities;
    wherein the user requirements include viewing points and interest points coordinates within the monitored area and the computed design parameters include an effective latitude of each security sensor unit for covering the interest points.

2. A computerized method for planning a security array of sensor units for monitoring a target site, said method comprising the steps of:
    obtaining site data including geographical data and CAD design information relating to the site;
    defining user requirements for the target site, including monitored area coordinates;
    defining design constraints relating to user requirements for the site data; and
    analyzing the site data with site definitions and constraint definitions, for computing at least one design parameter of the security array, wherein said analysis includes geometrical processing of site data for testing the design constraints effect on the sensor units monitoring capabilities;
    wherein the user requirements include the security sensor units attributes and the computed design parameters include the expected coverage area to be viewed from a given point of view based on security sensor capabilities in accordance with the sensors attributes.

3. A computerized method for planning a security array of sensor units for monitoring a target site, said method comprising the step of:
    obtaining site data including geographical data and CAD design information relating to the site;
    defining user requirements for the target site, including monitored area coordinates;
    defining design constraints relating to user requirements for the site data; and
    analyzing the site data with site definitions and constraint definitions, for computing at least one design parameter of the security array, wherein said analysis includes geometrical processing of site data for testing the design constraints effect on the sensor units monitoring capabilities;
    wherein the security sensors units are optical sensors;
    wherein the user requirements further include coverage area desired percentage and cost constraints and the computed design parameters include the positioning coordinates of the security sensors devices, wherein the analysis includes an optimization iterative process for calculating the optimal design parameters within the given constrains which provide the desired coverage area.

4. The method of claim 3 wherein the computed design parameters include latitude and angle of the sensor, said angle includes the parameters of sensor pitch, roll and yaw.

5. A computerized method for planning a security array of sensor units for monitoring a target site, said method comprising the steps of:
    obtaining site data including geographical data and CAD design information relating to the site;
    defining user requirements for the target site, including monitored area coordinates;
    defining design constraints relating to user requirements for the site data; and
    analyzing the site data with site definitions and constraint definitions, for computing at least one design parameter of the security array, wherein said analysis includes geometrical processing of site data for testing the design constraints effect on the sensor units monitoring capabilities; the creating a 3d graphic simulation presentation of the security array design including a colored map simulation of the coverage area;
    wherein the security sensors units are optical sensors.

6. A computerized method for planning a security array of sensor units for monitoring a target site, said method comprising the steps of:
    obtaining site data including geographical data and CAD design information relating to the site;
    defining user requirements for the target site, including monitored area coordinates;
    defining design contraints relating to user requirements for the site date; and
    analyzing the site data with site definitions and constraint definitions, for computing at least one design parameter of the security array, wherein said analysis includes geometrical processing of site data for testing the design constraints effect on the sensor units monitoring capabilities; wherein the CAD design information includes existing construction and future planed construction.

7. A computerized method for planning a security array of sensor units for monitoring a target site, said method comprising the steps of:
    obtaining site data including geographical data and CAD design information relating to the site;
    defining user requirements for the target site, including monitored area coordinates;
    defining design contraints relating to user requirements for the side data; and
    analyzing the site data with site definitions and constraint definitions, for computing at least one design parameter of the security array, wherein said analysis includes geometrical processing of site data for testing the design constraints effect on the sensor units monitoring capabilities; wherein the site data includes land condition and ownership wherein the design of the security array analysis includes calculations relating to the land condition and ownership constraints.

8. A computerized method for planning a security array of sensor units for monitoring a target site, said method comprising the steps of:
   obtaining site data including geographical data and CAD design information relating to the site;
   defining user requirements for the target site, including monitored area coordinates;
   defining design constraints relating to user requirements for the site data; and
   analyzing the site data with site definitions and constraint definitions, for computing at least one design parameter of the security array, wherein said analysis includes geometrical processing of site data for testing the design constraints effect on the sensor units monitoring capabilities; wherein the site data includes infrastructure data wherein the design of the security array analysis includes calculations relating to the infrastructure constrains including distance, accessibility, power supply and communication.

9. A computerized system for planning a security array of sensor units for for monitoring a target site, said system comprising:
   a raw Data Processing module for obtaining site data including geographical data and CAD design information;
   an interface graphical module for defining the target site user reguirements including monitored area coordinates;
   an interface module defining design constraints relating user requirements and site data; and
   a planning processes module integrated with a mathematic geometric engine (MGE) for analyzing site data with site definitions and constraint definitions, for computing at least one design parameter of the security array, wherein the geometrical processing of site data enables to test the design constraints affect on the sensors units monitoring capabilities;
   wherein the user requirements include viewing points and interest points coordinates within the monitored area and the computed design parameters include the effective latitude of each security sensor unit for covering the interest points.

10. A computerized system for planning a security array of sensor units for monitoring a target site, said system comprising:
   a raw Data Processing module for obtaining site data including geographical data and CAD design information;
   an interface graphical module for defining the target site user requirements including monitored area coordinates;
   an interface module defining design constraints relating user requirements and site data; and
   a planning processes module integrated with a mathematic geometric engine (MGE) for analyzing site data with site definitions and constraint definitions, for computing at least one design parameter of the security array, wherein the geometrical processing of site data enables to test the design constraints affect on the sensors units monitoring capabilities;
   wherein the user requirements include the security sensor units attributes and the conputed design parameters include the expected coverage area to be viewed from a given point of view based on security sensor capabilities in accordance with the sensors attributes.

11. A computerized system for planning a security array of sensor units for for monitoring a target site, said system comprising:
   a raw Data Processing module for obtaining site data including geographical data and CAD design information;
   an interface graphical module for defining the target site user requirements including monitored area coordinates;
   an interface module defining design constraints relating user requirements and site data; and
   a planning processes module integrated with a mathematic geometric engine (MGE) for analyzing site data with site definitions and constraint definitions, for computing at least one design parameter of the security array, wherein the geometrical processing of site data enables to test the design constraints affect on the sensors units monitoring capabilities;
   wherein the user requirements further include coverage area desired percentage and cost constrains and the calculated parameters include the positioning coordinates of the security sensors devices, wherein the analysis include an optimization iterative process for computing optimal design parameters within the given constraints which provide the desired coverage area.

12. A computerized system for planning a security array of sensor units for monitoring a target site, said systein comprising:
   a raw Data Processing module for obtaining site data including geographical data and CAD design information;
   an interface graphical module for defining the target site user requirements including monitored area coordinates:
   an interface module defining design constraints relating user requirements and site data; and
   a planning processes module integrated with a mathematic geometric engine (MGE) for analyzing site data with site definitions and constraint definitions, for computing at least one design parameter of the security array, wherein the geometrical processing of site data enables to test the design constraints affect on the sensors units monitoring capabilities;
   wherein the calculated parameters include latitude and angle of the sensor, said angle includes the parameters of sensor pitch, roll and yaw.

13. A computerized system for planning a security array of sensor units for monitoring a target site, said system comprising:
   a raw Data Processing module for obtaining site data including geographical data and CAD design information;
   an interface graphical module for defining the target site user requirements including monitored area coordinates;
   an interface module defining design constraints relating user requirements and site data;
   a planning processes module integrated with a mathematic geometric engine (MGE) for analyzing site data with site definitions and constraint definitions, for computing at least one design parameter of the security array, wherein the geometrical processing of site data enables to test the design constraints affect on the sensors units monitoring capabilities; and a Simulation Visualization Module (SVM) for creating a 3d graphic simulation presentation of the security array design including a colored map simulation of the coverage area.

14. A computerized system for planning a security array of sensor units for for monitoring a target site, said comprising:
- a raw Data Processing module for obtaining site data including geographical data and CAD design information;
- an interface graphical module for defining the target site user requirements including monitored area coordinates;
- an interface module defining design constraints relating user requirements and site data;
- a planning processes module integrated with a mathematic geometric engine (MGE) for analyzing site data with site definitions and constraint definitions, for computing at least one design parameter of the security array, wherein the geometrical processing capabilities; and
- wherein the CAD design information includes existing construction and future planed construction.

15. A computerized system for planning a security array of sensor units for for monitoring a target site, said system comprising:
- a raw Data Processing module for obtaining site data including geographical data and CAD design information;
- an interface graphical module for defining the target site user requirements including monitored area coordinates;
- an interface module defining design constraints relating user requirements and site data;
- a planning processes module integrated with a mathematic geometric engine (MGE) for analyzing site data with site definitions and constraint definitions, for computing at least one design parameter of the security array, wherein the geometrical processing of site data enables to test the design constraints affect on the sensors units monitoring capabilities; and
- wherein the site data include land condition and ownership wherein the design of the security array analysis includes calculations relating to the land condition and ownership constrains.

16. A computerized system for planning a security array of
- a raw Data Processing module for obtaining site data including geographical data and CAD design information;
- an interface graphical module for defining the target site user requirements including monitored area coordinates;
- an interface module defining design constraints relating user requirements and site data; a planning processes module integrated with a mathematic geometric engine (MGE) for analyzing site data with site definitions and constraint definitions, for computing at least one design parameter of the security array, wherein the geometrical processing of site data enables to test the design constraints affect on the sensors units monitoring capabilities; and
- wherein the site data include infrastructure data wherein the design of the security array analysis includes calculations relating to the infrastructure constrains including distance, accessibility, power supply and communication.

* * * * *